O. O. STORLE.
INTERNAL COMBUSTION ENGINE.
APPLICATION FILED NOV. 12, 1913.

1,275,494.

Patented Aug. 13, 1918.
3 SHEETS—SHEET 1.

Witnesses:
Fred Palm
Chas. L. Goss

Inventor:
Ole O. Storle
By Randers Bottum Fawsett & Bottum
Attorneys.

O. O. STORLE.
INTERNAL COMBUSTION ENGINE.
APPLICATION FILED NOV. 12, 1913.

1,275,494.

Patented Aug. 13, 1918.
3 SHEETS—SHEET 2.

Witnesses:
Fred Palm
Chas. L. Goso.

Inventor:
Ole O. Storle,
By Hanson & Rothem Fawcett Pitter
Attorneys.

O. O. STORLE.
INTERNAL COMBUSTION ENGINE.
APPLICATION FILED NOV. 12, 1913.
1,275,494.
Patented Aug. 13, 1918.
3 SHEETS—SHEET 3.
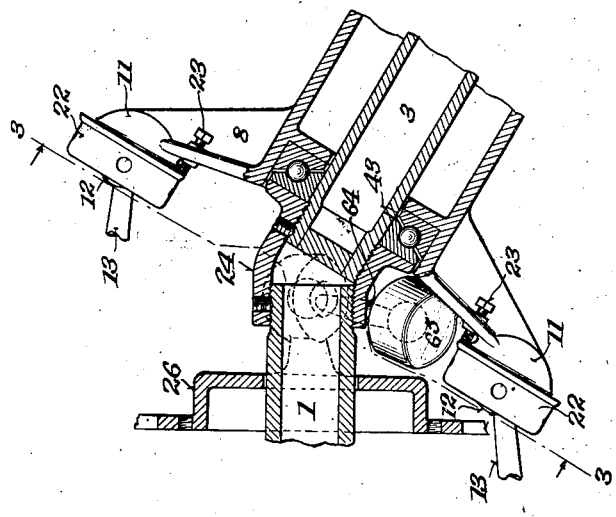

UNITED STATES PATENT OFFICE.

OLE O. STORLE, OF TACOMA, WASHINGTON, ASSIGNOR TO THE STORLE ENGINE COMPANY, OF KEWAUNEE, WISCONSIN.

INTERNAL-COMBUSTION ENGINE.

1,275,494.  Specification of Letters Patent.  Patented Aug. 13, 1918.

Application filed November 12, 1913. Serial No. 800,652.

*To all whom it may concern:*

Be it known that I, OLE O. STORLE, a citizen of the United States, residing at Tacoma, in the county of Pierce and State of Washington, have invented certain new and useful Improvements in Internal-Combustion Engines, of which the following is a specification, reference being had to the accompanying drawing, forming a part thereof.

The main objects of this invention are to reduce wear and friction in the power transmission connections of the pistons; to facilitate taking up any such wear; to utilize the mass of the cylinders and pistons as a fly or balance wheel; to provide simple and effective means for keeping the engine cool without water jackets; to provide for and facilitate thorough lubrication of the engine; and generally to improve the construction and operation of engines of this class.

The invention consists in the construction, arrangement and combination of parts as hereinafter particularly described and pointed out in the claims.

In the accompanying drawing like characters designate the same parts in the several figures.

Figure 1:
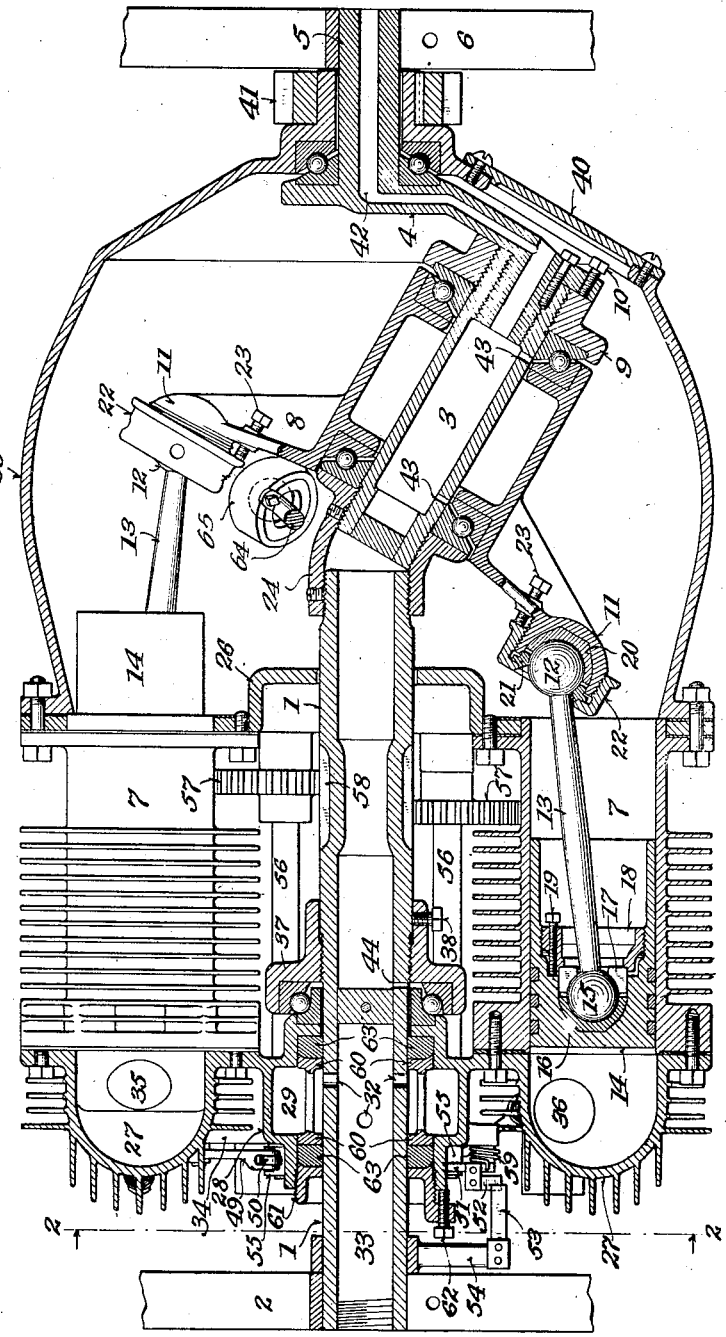
Figure 2:
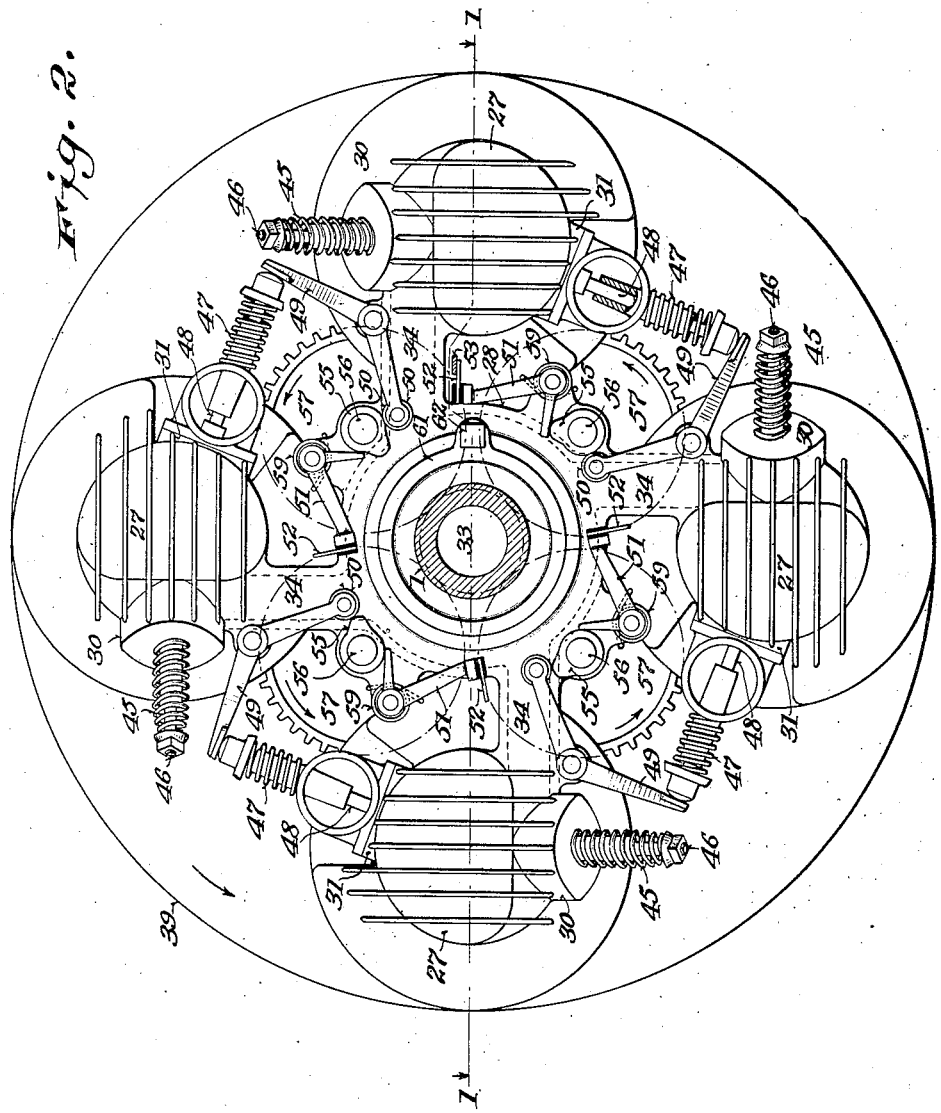

Figure 1 is an axial section on the line 1—1, Fig. 2, of a four-cylinder, four-cycle, internal combustion engine embodying the invention; Fig. 2 is a cross section on the line 2—2, Fig. 1, and an end elevation of the engine; Fig. 3 is a section on the line 3—3, Fig. 4, showing a modification of the means for connecting the thrust head with the engine cylinders and causing them to rotate together; and Fig. 4 is an elevation and a partial section of the same on the line 4—4, Fig. 3.

Referring to Figs. 1 and 2, 1 designates a relatively fixed tubular bearing shaft, fixed at one end to a base or frame member 2 and provided at the other end with a tubular bearing extension 3 connected therewith by a coupling member 24 at an oblique angle thereto.

The extension 3 is supported at its outer end by an arm 4, having a bearing shank 5 in axial alinement with the shaft 1, fixed to a base or frame member 6. A number of cylinders 7, in the present case four, are rotatably mounted on the shaft 1, with their axes parallel therewith and equidistant therefrom and from each other.

A rotary thrust head 8 is mounted on the extension 3, ball bearings being interposed between the hub of the head and the extension 3, and an adjusting ring 9 being threaded on the outer end of the extension 3 and fastened in place thereon by a set screw 10 for taking up wear or play in the ball bearings.

The head 8 is provided with socket bearings 11 spaced to correspond with the spacing of the cylinders, and in these socket bearings are fitted balls 12, at one end of connecting rods 13, which connect the head 8 with reciprocating pistons 14, fitted in the several cylinders.

The rods 13 are formed at the other end with balls 15, fitted in adjustable sockets provided therefor in the pistons. These sockets are each composed of a half section 16, fitted in a recess in the piston to receive one side of a ball 15, and of two sections 17, fitted over the other side of the ball around the connecting rod 13, which passes through and is free to vibrate a limited distance between them. The sections of the socket are held in place in the piston and on the ball by an adjusting ring 18, threaded in the piston and bearing at its inner end against the outer ends of the sections 17, sufficient clearance being left between the section 16 and the sections 17 for taking up wear and play. The ring 18 is fastened by a set screw 19, threaded in the ring and engaging with the piston. The socket bearings in the head 8 are of similar construction, but are made in two sections, 20 and 21, instead of three, the section 21, which is of annular form and surrounds the rod 13, being passed into place, in assembling the parts, over the ball 15, which is of smaller diameter than the ball 12. The sections 20 and 21 are secured in place in the head and on the ball 12 by an adjusting ring 22, threaded on a circular boss of the head surrounding the recess therein and formed with an inwardly projecting flange which bears against the annular section 21.

The ring 22 is secured in place by a set screw 23, threaded in the head 8 and engaging with the rim of the ring.

The head 8 is connected with the cylinders so as to compel them to rotate together by a link 64, having ball and socket joint connections 65 with said head and the casting 26 or other adjunctive part of the cylinders, as shown in Figs. 1, 3 and 4.

At their opposite ends the cylinders are closed by recessed heads 27, forming combustion chambers. These heads are preferably cast integrally with a central recessed sleeve 28, surrounding the shaft 1 and forming therewith an annular chamber 29, and are formed or provided, as shown in Fig. 2, with inlet valve chambers 30 and exhaust valve chambers 31. The annular chamber 29 communicates through lateral openings 32 with the bore of the shaft 1, which forms a fuel inlet or supply conduit or passage 33, and it is connected with the inlet valve chambers by passages 34. The inlet valve chambers communicate with the combustion chambers through ports 35, one of which is shown in Fig. 1, and the exhaust valve chambers communicate with said combustion chambers through ports 36, one of which is also shown in Fig. 1. The cylinders are rotatably supported on the shaft 1 by a ball bearing, one annular member of which is carried by the sleeve 28 and the other by an adjusting ring 37 threaded on said shaft and secured in place by a set screw 38.

The rotary thrust head 8 is inclosed by a case or housing 39, which is bolted with the casting 26 to the cylinders and has a ball bearing on the shank 5 of the supporting arm 4, in alinement with the shaft 1. This case serves not only to inclose and protect the working parts of the engine, but also to contain oil for their lubrication. It is formed opposite the outer end of the extension 3 with a hand hole, and provided with a removable cover 40, affording access to the adjusting ring 9 for taking up play or wear in the ball bearings between the extension 3 and head 8.

The hub of the case or housing 29 may be provided with a gear 41, as shown in Fig. 1, for transmitting power from the engine.

The arm 4 and its shank 5 are formed with a passage 42, which communicates with the bore of the shaft extension 3 for supplying oil or lubricant to the bearings of the rotary head 8, said extension being closed at its inner end and lateral openings 43 formed therein opposite the bearings.

The inner end of the shaft 1, which is separated from the fuel inlet conduit 33 by a plug or partition, may also be utilized to supply oil or lubricant to the ball bearing between the sleeve 28 and ring 37, a lateral opening 44 being formed in the shaft opposite said bearing, and the shaft, which is accessible between the cylinders 7, being provided with an oil or grease cup, or other means (not shown) for supplying it with the oil or lubricant.

The inlet chambers 30 are provided with inwardly opening valves, which are of the usual construction, and therefore not shown in detail, these valves being closed and held normally against their seats by springs 45 surrounding their stems 46, as shown in Fig. 2.

The exhaust valve chambers 31 are also provided with inwardly opening valves of the usual construction, and therefore not shown in detail. These valves, like the inlet valves, are closed and held normally against their seats by springs 47 surrounding their stems 48 between the valve cases and heads on the valve stems.

The cylinder heads are provided with bell crank levers 49, bearing at one end against the heads on the exhaust valve stems 48 and provided at the other end with rollers 50. Bell crank levers 51, also fulcrumed on the cylinder heads, are provided with insulated spring contact pieces 52, arranged to coöperate with a relatively fixed insulated spring contact piece 53, carried by an arm 54, which is mounted, as shown in Fig. 1, on the shaft 1, and angularly adjustable thereon to advance or retard the spark produced by the engagement and separation of each of the movable contact pieces 52 with the contact piece 53. Both the valve opening levers 49 and the contact levers 51 are operated by cams 55, mounted on shafts 56, which are in turn mounted parallel with the cylinders 7 in bearings provided therefor on the casting 26 and the sleeve 28.

The shafts 56 are provided with gears 57, which mesh with a pinion 58 on the shaft 1, (see Fig. 1) the gears having the ratio to the pinion of two to one.

The rollers 50 at the inner ends of the levers 49, are held in engagement with the cams 55 by the springs 47, and the shorter inwardly projecting arms of the contact levers 51 are held in engagement with said cams by springs 59, which also serve to retract and hold the contact pieces 52 out of operative position relative to the contact piece 53, except when the high parts of the associated cams 55 engage with the shorter inwardly projecting arms of the levers 51 on every second revolution of each contact piece 52 and the associated coöperating elements with the engine cylinders.

The sleeve 28 is formed at each side of the annular chamber 29 with stuffing boxes, in which connected and spaced packing supporting and compressing rings 60 are fitted. An adjustable gland 61, is threaded in the outer stuffing box and is fastened in adjusted position by a set screw 62. Suitable packing 63, interposed and compressed between the rings 60, and the inner end of the inner stuffing box and the gland 61, as shown in Fig. 1, form fluid tight joints between the shaft 1 and the sleeve 28, and prevent leakage from the chamber 29 around said shaft.

The cylinder and cylinder heads are formed, as shown, with cooling ribs or vanes, to increase their external surface and to more readily communicate the heat developed in the engine to the air through which they move.

The engine may be set and operated either horizontally as shown, or vertically, and the arm 4 and support 6 at one end thereof, may be omitted, particularly when the engine is set and operated in a vertical position, it being then supported solely at the lower or outer end of the shaft 1.

In the operation of the engine the gas or fluid fuel supplied through the conduit 33 and openings 32 to the annular chamber 29, is drawn therefrom through the passages 34 and ports 35 controlled by the automatic inlet valves into the combustion chambers in the recessed cylinder heads 27 on the suction strokes of the several pistons, as they make a half a revolution, represented by the upper part of Fig. 2, around the shaft 1.

During the next half revolution, represented by the lower part of Fig. 2, the pistons are forced by the thrust head 8 toward the heads 27 and compress the charges therein. At the beginning of the next half revolution, represented by the upper part of Fig. 2, the movable contact piece 52 of each cylinder is in turn moved by the associated cam 55 outwardly into position to engage with the fixed contact piece 53, as shown at the right in Fig. 2, and as said contact pieces are brought into engagement and separated by the rotary movement of the engine, a spark is produced in the usual manner between the terminals of the spark plug (not shown) of the associated cylinder. The charge in that cylinder being thus ignited, forces the piston toward the head 8, which owing to the oblique position of its axis to the shaft 1, tends to turn the cylinders, pistons and thrust head bodily in the direction indicated by an arrow on Fig. 2.

At the beginning of the next half revolution, represented by the lower part of Fig. 2, of each cylinder in which the firing or working stroke of the piston has just occurred, the high part of the associated cam 55, by engagement with the roller 50 of lever 49, opens the exhaust valve against the tension of its spring 47. At the end of the exhaust stroke and the beginning of the next suction stroke of each piston, the corresponding lever 51 remains in its retracted position, holding the contact piece 52 out of position for engagement with the contact piece 53.

These operations are repeated in the several cylinders in the proper order, the suction stroke of each piston being followed by the firing or working stroke of the next piston, and so on.

As there is comparatively little movement of the balls 12 and 15 in their socket bearings, there is very little friction and wear in the joints between the rods 13 and head 8 and the pistons 14.

Various modifications in the details of construction and arrangement of parts of the engine may be made within the spirit and scope of the invention as defined in the following claims.

I claim:

1. In an internal combustion engine the combination of a bearing shaft having an extension at an oblique angle thereto, a number of cylinders rotatably mounted on said shaft with their axes parallel therewith, a rotary thrust head mounted on said extension, a link connecting said thrust head and cylinders and compelling them to rotate together, reciprocating pistons fitted in said cylinders, and rods connecting the pistons with said head.

2. In an internal combustion engine the combination of a hollow stationary shaft forming a fuel inlet conduit, an internally recessed sleeve rotatably mounted on said shaft and forming therewith an annular chamber communicating with the inlet conduit through a lateral opening in said shaft, said sleeve being formed with stuffing boxes at the ends of said chamber, spaced and connected packing supporting rings fitted in said boxes, an adjustable gland fitted in the outer end of the outer box, and cylinders rotatably mounted with said sleeve on said shaft and provided with inlet valve chambers connected by passages with said annular chamber.

3. In an internal combustion engine the combination of a stationary supporting shaft provided with a pinion, a number of cylinders rotatably mounted on said shaft with their axes parallel therewith and provided with exhaust valves and chambers and with spring retracted electric contact levers and valve actuating levers, rotary shafts mounted on said cylinders parallel therewith and provided with cams and with gears meshing with said pinion, and a contact arm mounted and angularly adjustable on said shaft in the path of the contact parts of the contact levers when the latter are turned by the cams into operative position, the cams and their actuating gears being adapted to shift the contact lever and the valve actuating lever of each cylinder into position to produce a spark and to open the exhaust valve in proper rotation once to every two revolutions of the cylinders.

In witness whereof I hereto affix my signature in presence of two witnesses.

OLE O. STORLE.

Witnesses:
  Chas. L. Goss,
  Alice E. Goss.